United States Patent [19]

Gordon

[11] 4,243,715
[45] Jan. 6, 1981

[54] METALLIZED AMORPHOUS SILICA FABRIC FOR HIGH TEMPERATURE USE

[75] Inventor: Mack Gordon, Cleveland, Ohio

[73] Assignee: Aerodyne Development Corporation, Cleveland, Ohio

[21] Appl. No.: 33,953

[22] Filed: Apr. 27, 1979

Related U.S. Application Data

[63] Continuation-in-part of Ser. No. 928,854, Jul. 28, 1978, abandoned.

[51] Int. Cl.$^3$ .................. B01D 39/08; B01D 39/20
[52] U.S. Cl. .................................. 428/263; 428/268; 428/332; 428/388; 55/361; 55/522; 55/527; 55/524; 427/229; 427/404; 427/427
[58] Field of Search .............. 428/388, 263, 268, 273, 428/334, 335, 336, 434, 381; 427/229, 404, 427; 55/361, 429, 522, 524, 525, 527

[56] References Cited

U.S. PATENT DOCUMENTS

| | | | |
|---|---|---|---|
| 2,979,424 | 4/1961 | Whitehurst et al. | 428/388 |
| 3,006,403 | 10/1961 | Cooper | 428/273 |
| 3,019,515 | 2/1962 | Whitehurst et al. | 428/388 |
| 3,189,563 | 6/1965 | Hauel | 428/388 |

*Primary Examiner*—Ralph S. Kendall
*Attorney, Agent, or Firm*—Baldwin, Egan, Walling & Fetzer

[57] ABSTRACT

A fabric of amorphous silica is provided having greatly improved life for bag collectors at high temperatures. This is accomplished by applying a thin coating of gold on the amorphous silica fibers of which the fabric is made. The gold is non-reactive at high temperature and has sufficient lubricity to lubricate the fibers and prevent abrasion of adjacent fibers by each other. The gold coating additionally helps protect the amorphous silica fibers from devitrification. An additional coating of indium may also be applied to form a liquid film at high temperature for increased lubrication. The coating may be applied by dipping or spraying the fabric.

11 Claims, No Drawings

METALLIZED AMORPHOUS SILICA FABRIC FOR HIGH TEMPERATURE USE

This application is a continuation-in-part of my co-pending United States application Ser. No. 928,854, filed July 28, 1978, abandoned, entitled A Metallized Quartz Fabric for High Temperature Use.

BACKGROUND OF THE INVENTION

When subjected to elevated temperatures, bag collectors of amorphous silica fabric loses most of its strength during heating as well as after heating. This is due in part to devitrification, in part to solid and gaseous contaminants about the fabric as well as a loss of lubricant between adjacent fibers due to burnoff. This invention provides certain metal coatings on amorphous silica fabric for bag collectors to decrease the effects of contaminants, slow the devitrification process, and to provide a gold coating lubricant which will act at high temperature to avoid some of the frictional wear on the fibers. Amorphous silica fabric, when so coated, also may be used as heat barriers, as flame shields, or for filtering hot gases to remove particulate matter and other contaminants.

A fabric formed of amorphous silica fibers was selected as most suitable for use at high temperatures in bag collectors because amorphous silica fibers will maintain their shape and not soften or melt up to about 1450° C. They exhibit good, if not almost perfect, elasticity up to a temperature several times that of glass or otherwise desirable materials. An object of this invention is to provide a method of making such amorphous silica fabric useful at high temperatures by first thoroughly cleaning the fabric and then coating substantially every thread and fiber of such fabric with a thin coating of metal, such as gold, or a metal or combination of metals selected to resist certain high temperature conditions.

Other metals may be also applied as an added protection or as a second coating, over the first, which will act as an additional lubricant at high temperatures. Such a material is indium which has a liquidity from 156.16° C. to about 2000° C. Other metals useful as a second coating are bismuth and tin.

Other objects and advantages of this invention will be apparent from the accompanying description and the essential features thereof will be set forth in the appended claims.

A commercially available amorphous silica fabric was selected as a basic material for demonstration of this invention for use in bag collectors. This cloth was woven with a satin weave, but other weaves of amorphous silica fabric might be used as well as felted amorphous silica fibers, all of which are found in gas/solid filtration. Each thread of the fabric was composed of a plurality of separate amorphous silica fibers. The fabric, as supplied, is of a thickness of between about 0.004 inches and about 0.0132 inches, or slightly thicker, and weighing in ounces per square foot between about 3.3 and 9.24. Test strips were prepared 1 ¼ inches wide by 4 ¾ inches long. Such a strip cut from material supplied by the manufacturer had a breaking point of 160 pounds. Such a strip cut from material as supplied by the manufacturer, when fired to a temperature of 926° C., had a breaking point of 8 pounds. Other tests were made which proved that some coatings already on the amorphous silica cloth, as supplied by the manufacturer, when fired in the furnace to a high temperature caused a severe loss of tensile strength. Even clean amorphous silica cloth will not take high temperature for very long without the coating of this invention.

The amorphous silica fabric was then thoroughly cleaned using a vacuum/pressure process to assure that each fiber was contacted by the cleaning fluid. In one embodiment a chromic acid cleaning mixture was used, such as a mixture of sulfuric acid and sodium dichromate at 160° F. and higher. Any other thorough cleaning process might be used for this step if found to be successful for complete cleaning.

This clean amorphous silica fabric was then coated with a thin coating of gold, equal to at least about 0.000,005 inches thick on each fiber. For production purposes, in one embodiment, a coating process will utilize a line through which will continuously run a width of amorphous silica fabric through a vacuum/pressure cleaning station, using a chromic acid cleaning mixture, or the equivalent, then a rinse, then an air dryer, then a dipping through a gold coating solution, after which wringer rolls or other excess liquid removal means is provided to remove the excess metal solution, plus an air dry and then a low temperature cure at about 300° F. and a high temperature cure at about 1200° F. If necessary, a second, a possibly a third dip station might be added after the first dip station mentioned hereinbefore. If any fabrication or forming of the coated fabric is required, it is preferably performed before cure.

The gold may be applied as a dispersion, or as a metallic salt. Such a gold product may be dissolved in a suitable solvent and/or a binder added. Such a gold product may be sprayed or dipped or otherwise applied such that all of the amorphous silica fibers are coated.

In one embodiment, a gold coating was applied using between 2.5 percent to 45.0 percent gold trichloride ground into a suspension solution consisting essentially of lavender oil, solvents and burgundy pitch. The amorphous silica fabric as supplied by the manufacturer and only given the cleaning treatment hereinabove mentioned, using test strips 1¼ inches wide and 3¾ inches long, and heated to 926° C. in a test, had a breaking point of 25 pounds for the test strip. Similar amorphous silica fabric, after being first cleaned as described above, and given a light coating of gold, between 2.5 percent and 45.0 percent gold trichloride in a suspension solution, and heat cured as before to 1200° F., gave a breaking point, using the same test, of 74 pounds on the same size test strip.

As amorphous silica has a softening point of about 1600° C. and a melting point of about 1750° C., the improved gold coated amorphous silica fabric as described herein as designed for use up to 1650° C. or at least up to 1450° C., which is the unstable or strain point of amorphous silica.

It should be understood that the amorphous silica fabric is coated with gold in a manner that will apply a very thin coating directly on each of the individual amorphous silica fibers. Such a coating protects the fibers by its lubricating effect which substantially prevents, or at least minimizes, the abrasive or cutting action of the bare fibers on each other as would otherwise occur. Such a coating must be capable of providing effective lubrication between the fibers and must be non-reactive, or essentially inert, at temperatures as high as 1600° F. which is an operating temperature for filters in which the coated amorphous silica fabric could be used. Gold meets these requirements since it has sufficient lubricity and protective qualities, when heated, to provide the desired lubricating effect and is non-reactive even at quite high temperatures.

The high temperature of the cure treatment causes the gold compound or salt to decompose and the volatile components are driven off, leaving a pure gold coating. The amorphous silica fibers are, of course, very small and have typical diameters between 2.0 and $3.0 \times 10^{-5}$ inch. The thickness of the gold coating can be controlled in the application process and should be less than the diameter of the fibers.

In some cases, a specific effect may be necessary or desirable, and this may be obtained by means of coating the gold with a material which is liquid at the operating temperature. Such a material must meet the same requirements as mentioned above in connection with the gold, that is, it must provide the required lubricity and must be essentially non-reactive or inert at high temperature. The preferred material for this purpose is indium, which has a melting point of approximately 156° C. so that it is liquid in the operating temperature range in which the fabric is to be used. The indium may be applied to the gold-coated amorphous silica fabric by spraying finely-dispersed metallic indium as a hot spray, or by applying the indium in the form of a suitable salt which is then decomposed to metallic indium by heating. At temperatures above its melting point, the indium becomes liquid but has sufficient surface tension and adhesion to remain in place as a thin film or coating of liquid on the surface of the gold-coated fibers. The lubricity of such an overcoating liquid film increases the lubricating effect and thus further protects the amorphous silica fibers from the self-destructive abrasive effect of the fibers rubbing across each other when the material is flexed. The application of the successive coatings by spraying or dipping, followed by heating, as described, can be controlled to obtain the thin coatings required by the small size of the amorphous silica fibers.

It will now be apparent that a coated amorphous silica fabric has been disclosed, together with a method for applying the gold coating, which results in effectively protecting the fabric from the self-destructive abrasive action of uncoated amorphous silica fibers and in retarding devitrification. The new fabric, therefore, is protected against deterioration at high temperature and is very suitable for bag collector filters or for such other uses as a filter material for cleaning hot gases, for flame screens, or for any desired use where long life at high temperature is necessary.

I claim as my invention:

1. A fabric for use in bag collectors at high temperatures, consisting of said fabric made solely of amorphous silica fibers and each of said fibers having a thin coating of gold directly covering the surface of the amorphous silica fibers.

2. A fabric as defined in claim 1, wherein said gold coating is at least 0.000,005 inches thick on each fiber.

3. A fabric as defined in claim 1 made up of threads interengaged to form a cloth, each thread consisting of a plurality of said coated fibers.

4. A fabric as defined in claim 3 in which the thickness of the coating on each fiber is less than the diameter of the fiber.

5. A fabric as defined in claim 3 in which each strand has a coating of indium applied by a hot spray of finely dispersed metallic indium or as an indium salt covering the surface of the gold coating.

6. A fabric as defined in claim 5 in which the thickness of the indium coating is less than that of the gold coating.

7. A method of treating a fabric made of amorphous silica fibers for bag collectors for high temperature use, said method consisting of the steps of thoroughly cleaning said fabric and thereafter applying a thin coating of gold directly covering the surface of each of said fibers.

8. A method as defined in claim 7 in which a gold salt is applied to said fabric in a liquid vehicle, and thereafter heating the fabric.

9. A method as defined in claim 8 including the further step of applying a thin coating of indium over said gold coating.

10. A method as defined in claim 9 in which said indium is applied as a spray to cover the gold coating.

11. A method as defined in claim 7 in which finely divided gold is applied in a suspension vehicle, and thereafter heating the fabric.

* * * * *